Patented Dec. 10, 1940

2,224,836

UNITED STATES PATENT OFFICE 2,224,836

2-AMINOPYRIMIDINES

Richard O. Roblin, Jr., and Jackson P. English, Stamford, Conn., assignors to American Cyanamid Company, New York, N. Y., a corporation No Drawing. Application April 26, 1940, Serial No. 331,754

9 Claims. (Cl. 260—251)

This invention relates to an improved process of producing 2-aminopyrimidines.

In the past isocytosine has been produced only by processes which involve a large number of steps with poor yields or expensive reagents so that their cost has been so high that they have remained largely laboratory curiosities. The processes formerly used in acid medium did not produce compounds containing the amino group in the 2 position directly, but on the contrary produced compounds having other groups in this position which were then transformed into amino groups.

The process of the present invention produces isocytosine by condensing a guanidine salt with formylacetic acid. It is not necessary that the formylacetic acid be used in the chemically pure state. On the contrary, an impure reaction mixture containing formylacetic acid produced by the treatment of malic acid with fuming sulfuric acid is entirely satisfactory, and it is an advantage of the present invention that relatively impure reagents can be employed which clearly reduces the cost.

The present invention operates effectively with substantially any guanidine salts. For practical purposes it is preferred to use the cheap guanidine salts, such as the sulfate, but the nature of the anion is not critical as it does not appear to enter into the reactions except in the case of acids which would be capable of reacting with the compounds produced or with the reagents. Hence, other guanidine salts, such as the carbonate, hydrochloride, and the like, may be used.

The invention may be described in conjunction with the following specific examples which are illustrations of the present process in the production of isocytosine but is not limited to the details therein set forth. The parts are by weight except for liquids where the corresponding part by volume is used.

Example 1

1,600 parts of 20% fuming sulfuric acid are cooled by stirring in a solid carbon dioxide-alcohol bath until they begin to freeze. Thereupon 360 parts of malic acid, which represents a slight excess, is slowly added with vigorous stirring while maintaining the temperature below 4° C. After all of the malic acid has been stirred in, 300 parts of dry guanidine sulfate are added. The addition of the guanidine sulfate may be more rapid than that of the malic acid but good stirring is desirable. During the addition of the guanidine sulfate the oleum melts, but the temperature does not substantially exceed 4° C. The mixture, after the addition of all of the guanidine sulfate, is permitted to warm spontaneously to room temperature and then is heated cautiously by indirect steam heat with vigorous stirring for about an hour.

The reaction mixture is then cooled with ice water and poured onto 5,000 parts of ice. The aqueous solution resulting is then neutralized with approximately 5,250 parts of 28% aqueous ammonia solution, the temperature rise being avoided by cooling with ice. After standing for several hours, the precipitate which forms is filtered and dried at about 60° C., the yield being about 200 parts, representing a 69% yield of theory. The melting point of the crude product thus obtained is 268° C. If it is desired to purify the crude product, it is dissolved in 1,600 parts of boiling water, boiled with decolorizing carbon for about 20 minutes and then cooled and the product crystallizing out. 148 parts of pure product having a melting point of 275° C. is thus obtained. The mother liquors may be concentrated and further amounts recovered.

Example 2

The procedure of Example 1 is followed up to the production of an aqueous solution by pouring the reaction mixture onto the ice. Instead of neutralizing with 5,250 parts of aqueous ammonia solution, a smaller amount of ammonia is used, preferably about 4,300 parts, which represents an amount of ammonia insufficient to neutralize all of the acid in the reaction mixture.

Filtration is then effected immediately before the desired product has precipitated in any considerable amount. This removes impurities which precipitate immediately on neutralization. Following the first filtration, further amounts of ammonium hydroxide are added to completely neutralize the filtrate. After standing for several hours the desired product then precipitates out and is filtered and dried at about 60° C. The product is much purer than in Example 1 but the yield is smaller, dropping to about 150 parts. This loss in yield does not represent a corresponding loss of pure product as on recrystallization from boiling water smaller loss is noted. However, the product produced by the above modification is sufficiently pure so that after a much simpler and cheaper purification procedure which forms the subject matter of the application of J. P. English, Serial No. 331,752, filed April 26, 1940, the resulting product is sufficiently pure for use as an intermediate in the production of unsubstituted 2-aminopyrimidine, an intermediate useful in the production of chemotherapeutic agents of the sulfanilamidpyrimidine type.

We claim:

1. A method of producing isocytosine which comprises condensing a guanidine salt with formylacetic acid.

2. A method of producing isocytosine which comprises reacting a guanidine salt with a crude mixture containing formylacetic acid obtained by the treatment of malic acid with fuming sulfuric acid.

3. A method of producing isocytosine which comprises mixing an excess of malic acid with fuming sulfuric acid at a low temperature and then adding a guanidine salt, raising the temperature of the reaction after the addition of the guanidine salt gradually to room temperature, and then heating the reaction mixture at a temperature about the boiling point of water.

4. A method of making isocytosine which comprises adding guanidine sulfate to fuming sulfuric acid and then gradually adding malic acid to the reaction mixture while maintaining the temperature at a low point, permitting the temperature to gradually rise to room temperature and then heating at the temperature about the boiling point of water.

5. A method according to claim 3 in which the reaction temperature between guanidine sulfate and the formylacetic acid is maintained at not above approximately 4° C. until all of the reagents have been incorporated in the reaction mixture.

6. A method according to claim 4 in which the reaction temperature between guanidine sulfate and the formylacetic acid is maintained at not above approximately 4° C. until all of the reagents have been incorporated in the reaction mixture.

7. A method according to claim 2 in which the reaction mixture is cooled and poured on ice, neutralized with ammonium hydroxide, and a crude isocytosine removed by filtration.

8. A method according to claim 3 in which the reaction mixture is cooled and poured on ice, neutralized with ammonium hydroxide, and the crude isocytosine removed by filtration.

9. A method according to claim 4 in which the reaction mixture is cooled and poured on ice, neutralized with ammonium hydroxide, and the crude isocytosine removed by filtration.

RICHARD O. ROBLIN, Jr.
JACKSON P. ENGLISH.